United States Patent [19]
Swars et al.

[11] Patent Number: 5,643,484
[45] Date of Patent: Jul. 1, 1997

[54] ELECTRICALLY HEATABLE HONEYCOMB BODY WITH RESISTANCE INCREASED BY SLITS

[75] Inventors: Helmut Swars; Rolf Brück, both of Bergisch Gladbach, Germany

[73] Assignee: Emitec, Gesellschaft fuer Emissionstechnologie mbH, Lohmar, Germany

[21] Appl. No.: 484,523

[22] Filed: Jun. 7, 1995

Related U.S. Application Data

[63] Continuation-in-part of PCT/EP94/00194 Jan. 25, 1994.

[30] Foreign Application Priority Data

Feb. 8, 1993 [DE] Germany .................. 43 03 601.5

[51] Int. Cl.$^6$ .................. H05B 3/10; F01N 3/10
[52] U.S. Cl. .................. 219/552; 60/300; 55/DIG. 30; 422/174
[58] Field of Search .................. 219/552–553; 392/485, 488; 60/300; 55/DIG. 30; 422/174, 180, 199, 211

[56] References Cited

U.S. PATENT DOCUMENTS

| | | | |
|---|---|---|---|
| 3,785,781 | 1/1974 | Hervert et al. | 422/180 X |
| 5,130,208 | 7/1992 | Maus et al. | 428/593 |
| 5,272,875 | 12/1993 | Kaji | 422/180 X |
| 5,307,626 | 5/1994 | Maus et al. | 60/300 |
| 5,316,997 | 5/1994 | Toyoda et al. | 428/116 |
| 5,395,599 | 3/1995 | Koshiba et al. | 422/180 |
| 5,436,216 | 7/1995 | Toyao et al. | 55/DIG. 30 |

FOREIGN PATENT DOCUMENTS

| | | |
|---|---|---|
| 0316596 | 5/1989 | European Pat. Off. |
| 0559907 | 9/1993 | European Pat. Off. |
| 92/02714 | 2/1992 | WIPO |
| 92/13635 | 8/1992 | WIPO |

*Primary Examiner*—Teresa J. Walberg
*Assistant Examiner*—Raphael Valencia
*Attorney, Agent, or Firm*—Herbert L. Lerner; Laurence A. Greenberg

[57] ABSTRACT

An electrically heatable honeycomb body, in particular a carrier body for a catalytic converter, includes wound, stacked or otherwise layered sheet-metal layers along which a fluid can flow in a primary flow direction, with at least some of the layers being structured. At least one layer has openings for lengthening and/or narrowing an electrically conductive path therein. The structuring of the layers and the formation and disposition of the openings cause adjacent layers to touch substantially only at locations without the openings in the at least one layer. A sheet-metal layer has raised locations and a periodic and in particular approximately undulating or trapezoidal structure with rising and falling regions and a periodicity defining a period. A method for producing slits extending approximately parallel to the raised locations includes delivering the layer with the periodic structure to a shearing device having a periodic structure, having first and second shears facing one another and being offset from one another, and having a periodicity being equal to the periodicity of the period of the layer, and touching the layer with the shearing device only in at least one of the regions. The shears are moved toward one another until the layer is firmly clamped. The first shears are moved relative to the second shears and a slit is created in each of the rising and falling regions by shearing. The shears move away from one another and expel the slit layer.

18 Claims, 5 Drawing Sheets

PRIOR ART

FIG.3

PRIOR ART

FIG.4

PRIOR ART

ELECTRICALLY HEATABLE HONEYCOMB BODY WITH RESISTANCE INCREASED BY SLITS

CROSS-REFERENCE TO RELATED APPLICATION

This application is a Continuation of International Application Ser. No. PCT/EP94/00194, filed Jan. 25, 1994.

BACKGROUND OF THE INVENTION

Field of the Invention

The invention relates to an electrically heatable honeycomb body through which a fluid can flow, including wound, stacked or otherwise layered sheet-metal layers, in particular for use as a carrier body for a heatable catalytic converter in combination with an internal combustion engine, wherein electrical resistance varies an electrical current flowing through the carrier body. The invention also relates to a method for producing slits in the sheet-metal layers.

Heatable honeycomb bodies are employed as carrier bodies for catalytic converters for the exhaust gases of internal combustion engines and particularly as heatable catalysts or so-called precatalysts. In the catalytic conversion of combustion exhaust gases, it is important for the catalytic converter to have an operating temperature that is above an ignition temperature beyond which an exothermic catalytic conversion of the combustion exhaust gases begins. In the cold-starting phase of an internal combustion engine, the muffler and the catalytic converter of the exhaust system are not yet at a high enough temperature to provide sufficient catalytic conversion of the exhaust gases. As automobile traffic grows heavier and heavier, provoking ever more stringent exhaust gas regulations, it is a goal to assure virtually complete catalytic conversion of exhaust gases even during the cold-starting phase of engine operation. To that end, it is known to use electrically heatable catalytic converters, or heatable precatalysts that precede a conventional catalytic converter.

One such heatable electric honeycomb body is disclosed in International Patent Application WO 92/02714, corresponding to U.S. Pat. No. 5,411,711, for example. That reference in particular shows a kind of construction characterized by stacks of sheet-metal layers intertwined in an S. That lengthens the path of a current flowing through the electrically heatable honeycomb body.

Published International Application WO 92/13635, corresponding partially to U.S. patent application Ser. No. 08/353,964, filed Dec. 12, 1994, also discloses a honeycomb body that can be heated with nonhomogeneous current distribution, and thus with uneven heat output. That honeycomb body is formed of at least one, at least partially structured, metal sheet, which is wound or layered to make layers and is intertwined, forming a number of channels through which a fluid can flow. At least one electrical path is formed in the sheet-metal layers, and that path has an electrical resistance of nonhomogeneous distribution over the length of one such layer. The nonhomogeneity of the resistance is attained by slits, which are present at certain points or locations of the individual layers within the wound honeycomb body. Making slits in the individual layers before they are wound up to make the honeycomb body makes it possible to increase the electrical resistance of the honeycomb body as compared with one made up of unslit sheet-metal layers. Through the use of such slits, it is, for instance, possible for the electrical resistance of an electrically heatable precatalyst built into the exhaust system of a passenger car to be dimensioned in a purposeful way.

It is also known, from Published European Patent Application 0 316 596 A2, corresponding to U.S. Pat. No. 4,958,428, to make notches directly in the sheet-metal strips even before the carrier body is wound or folded up. Carrier bodies made in that way are capable of dissipating thermal strains during operation, between the jacket tube and the sheet-metal strips wound up in it.

For the sake of a purposeful configuration of the electrical resistance of a heatable carrier body, as in the prior art cited, purposeful slits or slit structures must be machined into the individual sheet-metal layers. However, in the ensuing winding, stacking or otherwise layering of the sheet-metal layers, such slits in a sheet-metal layer often become bridged over by raised points in an adjacent sheet-metal layer, which leads to undesirable, poorly replicable changes in the electrical resistance of such a carrier body. Moreover, such spotwise "short circuits" can cause disproportionately high current densities in those regions, which can lead to very hot spots. Such an over-bridging phenomenon is especially serious in the case of slits which are made obliquely in the sheet-metal layers relative to the structures thereof.

In order to construct carrier bodies with a predetermined electrical resistance, it is initially important for the resistance of the individual sheet-metal layers to be determined precisely, by measurement and calculation, before the sheet-metal layers are processed to make a carrier body. Subsequently, for a predetermined type of stacking, winding or the like of the individual sheet-metal layers, the expected electrical resistance of the overall carrier body can be accurately predetermined. However, that is only possible if no uncontrollable bridging over of slits, with the attendant short circuits, occurs within the resultant carrier body when the individual sheet-metal layers are processed to make a carrier body.

SUMMARY OF THE INVENTION

It is accordingly an object of the invention to provide an electrically heatable honeycomb body with resistance increased by slits and a method for producing the slits, which overcome the hereinafore-mentioned disadvantages of the heretofore-known devices and methods of this general type, which provide a honeycomb body of well-defined, increased resistance, at least in some portions, through the use of openings in the sheet-metal layers, and which provide a suitable production process for furnishing sheet-metal layers that are provided with openings and which result in such carrier bodies of well-defined resistance after being processed.

With the foregoing and other objects in view there is provided, in accordance with the invention, an electrically heatable honeycomb body, in particular a carrier body for a catalytic converter, comprising wound, stacked or otherwise layered sheet-metal layers along which a fluid can flow in a primary flow direction; at least some of the sheet-metal layers being structured; the sheet-metal layers including at least one sheet-metal layer or strip having openings formed therein lengthening and/or narrowing an electrically conductive path in the at least one sheet-metal layer and defining locations without the openings in the at least one sheet-metal layer; the structuring of the sheet-metal layers and the formation and disposition of the openings causing adjacent sheet-metal layers to touch substantially only at the locations without the openings in the at least one sheet-metal layer.

The electrically heatable honeycomb body, through which a fluid can flow in the primary direction, includes wound, stacked or otherwise layered sheet-metal layers, at least some of which are structured. These layered sheet-metal layers include at least one metal strip with openings, which lengthen, or narrow, or simultaneously lengthen and narrow an electrically conductive path in the metal strip. The sheet-metal layers are structured in such a way, and openings are formed and disposed in them in such a way, that adjacent sheet-metal layers essentially touch only at points where there are no openings in the metal strip.

The invention thus assures that increases in resistance in the individual metal strips attained by the making of the slits lead to an increased electrical resistance of an entire honeycomb body in a controlled manner, when the individual metal strips are processed to make the honeycomb body.

In accordance with another feature of the invention, the honeycomb body includes stacks, being wound in a spiral or an S, of a plurality of alternating smooth and structured metal strips.

In accordance with a further feature of the invention, the openings in the metal layers or strips take the form of slits that are each disposed in the individual metal layers or strips at a certain angle $\alpha$ to the primary flow direction, wherein the angle $\alpha$ is between 0° and 45° and preferably between 10° and 30°.

In accordance with an added feature of the invention, at least one of the touching metal strips has a deformation at the location or point where an opening is located, which is constructed in such a way that the two metal strips are spaced apart from one another in the region of the opening. This avoids a conductive bridging over of the opening in a first metal strip from touching the second metal strip. The opening may be in either the deformed metal strip or the undeformed metal strip.

In accordance with an additional feature of the invention, a conductive bridging of an opening in a first metal strip by a second adjacent metal strip is prevented by furnishing a honeycomb body in which at least one of a plurality of adjacent sheet-metal layers likewise has an opening at locations or points where the opening or openings of an adjacent sheet-metal layer would be conductively bridged over, if such an opening were not provided at those points or locations.

In accordance with yet another feature of the invention, the structured metal layers or strips of the honeycomb body have a periodic and in particular undulating structure with a period L, the openings in the metal layers or strips are disposed with a spacing A between the centers of adjacent openings in the direction of the periodic structure, A is approximately equal to L, and the raised locations or points of the periodic structure of the structured metal layers or strips always touch adjacent metal layers or strips only at locations or points located between the openings.

In accordance with yet a further feature of the invention, the periodic structure of the metal strips is an approximately sinusoidal or trapezoidal periodic structure, and openings are provided only in a rising and/or falling region of the periodic structure, that is in a lateral or flank region. This disposition of the openings is also especially suitable for honeycomb bodies that are constructed from only structured sheets, without smooth sheets between them.

In accordance with yet an added feature of the invention, there are provided slit-like openings, which extend approximately parallel to the structures in the lateral regions of the wound metal layers or strips that form the honeycomb body.

With the objects of the invention in view, there is also provided, in a method for producing slits extending approximately parallel to raised locations of a sheet-metal layer having a periodic and in particular approximately undulating or trapezoidal structure with rising and falling regions or in other words a lateral or flank region and a periodicity defining a period, the improvement which comprises a) delivering the sheet-metal layer with the periodic structure to a shearing device or shears having a periodic structure, having first and second shears facing one another and being offset from one another, and having an essentially rectangular profile with a periodicity being equal to the periodicity of the period of the sheet-metal layer, and touching the sheet-metal layer with the shearing device only in at least one of the regions; moving the first and second shears toward one another until the corrugated sheet-metal layer is firmly clamped; subsequently effecting a relative motion of the first and second shears and creating a slit in each of the rising and falling regions by shearing; and moving the shears away from one another and expelling, ejecting or releasing the finished slit sheet-metal layer.

Other features which are considered as characteristic for the invention are set forth in the appended claims.

Although the invention is illustrated and described herein as embodied in an electrically heatable honeycomb body with resistance increased by slits and a method for producing the slits, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
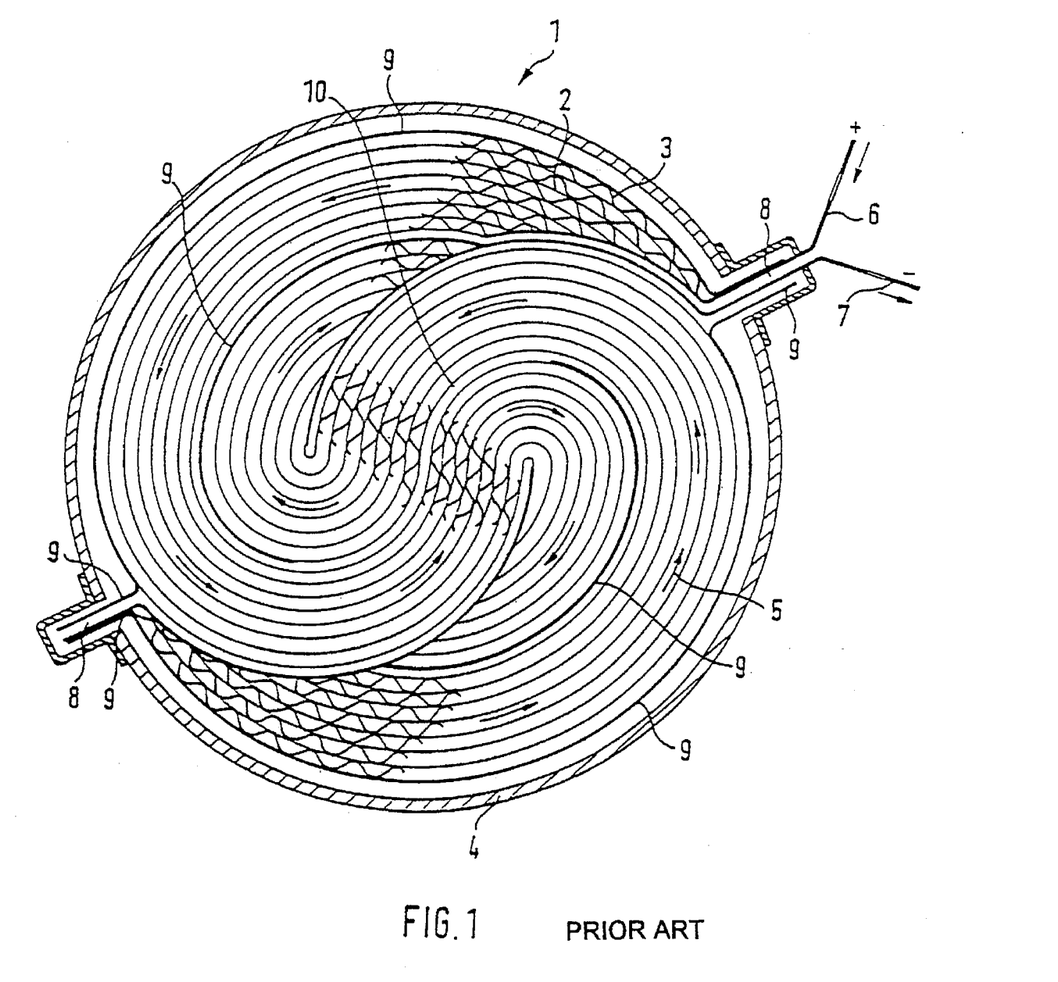
FIG. 1 is a diagrammatic, cross-sectional view of a honeycomb body of the invention, having alternating smooth and corrugated sheet-metal layers, being wound in an S with some of them being isolated from others, defining an S-shaped current path.

Referring now to the figures of the drawing in detail and first, particularly, to FIG. 1 thereof, there is seen a typical honeycomb body 1, which includes two stacks, each being formed by seven smooth sheet-metal layers 2 and seven corrugated sheet-metal layers 3 disposed in alternation on one another, with the two stacks being intertwined in an S. The two intertwined stacks are separated from one another by an insulation layer 8 and are located in the interior of a housing 4. A supply of electrical current 5 is effected through a power lead 6, while a diversion of the current 5 is effected through an outgoing current lead 7. Current distribution structures 9 assure a uniform distribution of the current density in the honeycomb body 1. Following arrows shown in FIG. 1, it is seen that the current 5 first takes an S-shaped path and flows into the first stack through the power lead 6 and the current distribution structures 9, which surround a first end of the first stack in nose or beak-like fashion, and then is received by the current distribution structures 9 that again surround a second end of the first stack in nose or beak-like fashion. From there, the current is again fed through the current distribution structures 9, again surrounding a first end of the second stack like a nose or beak, into the second stack, and then flows back again through the second stack in the opposite direction from the first S-shaped path. At the end of the second stack, the current is again received by the current distribution structures 9 that again surround the second end of the second stack in beak-like fashion. From there, the current is then diverted to the outside through the outgoing current lead 7 which passes through a leadthrough or duct. Some of the current distribution structures 9 extend into the interior of a cap, on the side of the housing 4 opposite the duct. Inside this cap, the incoming lead 6 and the outgoing lead 7 are separated from one another by the insulation layer 8, just as they are in the duct. An insulator (a gap or insulation material) also electrically separates partial regions in the interior of the honeycomb body 1 from one another. According to the invention, openings, especially slits, are located in the smooth metal strip 2 or in the corrugated metal strip 3, or in both. These openings increase the electrical resistance of the sheet-metal layers, and as a result, the overall electrical resistance of the honeycomb body 1 is raised to a variable extent, depending on the size and number of these slits. Therefore, with a constant applied voltage, the power takeup or heating of the honeycomb body 1 can be reduced more or less and/or limited to portions of the honeycomb body.

Figure 2:
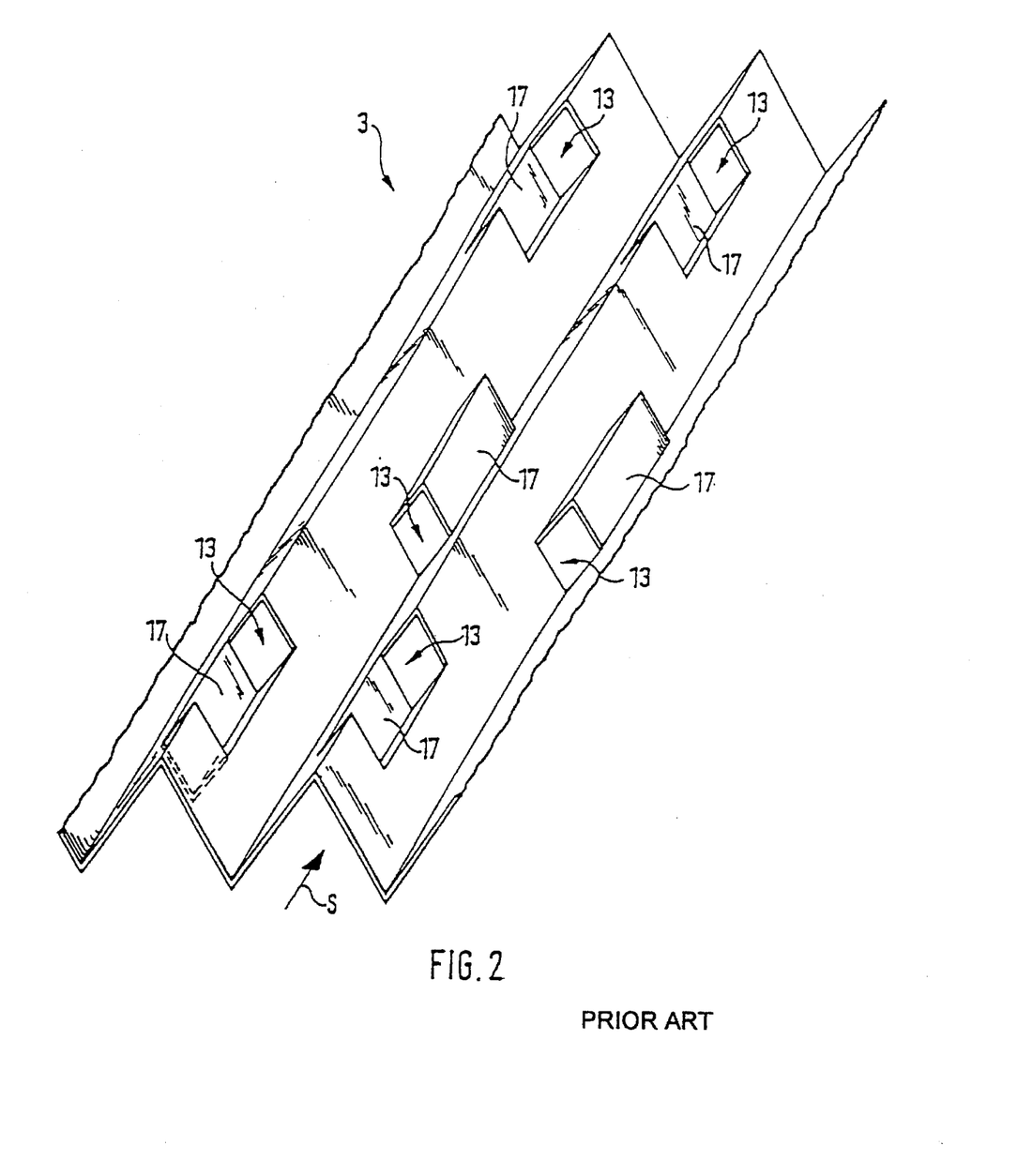
FIG. 2 is a fragmentary, perspective view of a typically structured metal strip in accordance with the prior art, having deformations and openings.

FIG. 2 shows a structured metal strip 3. In this case, the structure is a periodic triangular structure, with openings 13 and deformations 17. This kind of structure of a metal strip 3 is known from the prior art, such as U.S. Pat. No. 5,130,208. This metal strip 3 with a triangular structure could also replace the corrugated metal strip 3 of FIG. 1. Due to the deformations 17, a thus-structured metal strip 3 does not touch over the entire length of the crests or troughs of the corrugations of adjacent layers. For better illustration, it can also be noted that a primary flow direction of the fluid flowing through the honeycomb body 1 of FIG. 1 is perpendicular to the plane of the drawing, while in FIG. 2 a primary flow direction S extends along the V-shaped troughs. Such openings 13 and deformations 17 also affect the flow behavior of the fluid through the honeycomb body 1 and thereby also affect the rate of conversion of the exhaust gases in the fluid that are to be decomposed, though that is less important in this case. The effect of the deformations 17 is that slits in adjacent layers at those points will not be electrically bridged over.

Figure 3:
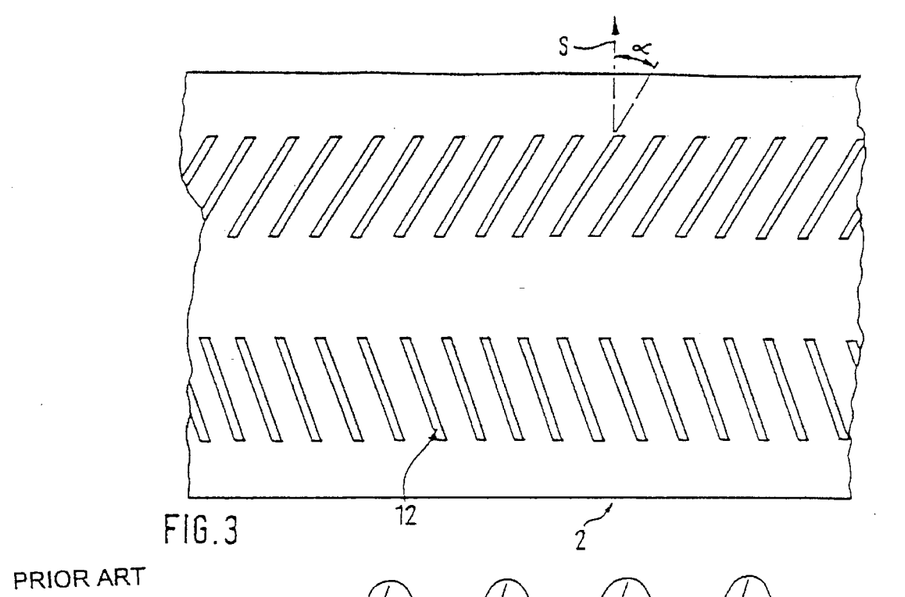
FIG. 3 is a fragmentary, elevational view of a smooth metal strip with typical, obliquely disposed slit-like openings.

FIG. 3 shows a smooth metal strip 2, which has two parallel rows of slits 12. In the processed state, that is once the sheet 2 has been stacked or wound in the honeycomb body 1, combustion exhaust gases flow past this sheet 2 in a primary flow direction S. This primary flow direction S of the combustion fluids extends essentially at right angles to the long edges of the sheet-metal strip. In the case of the slits 12 shown in FIG. 3, this means that they are each disposed at an angle $\alpha$ relative to the primary flow direction S of the fluids. The slits 12 in the two parallel rows may be inclined in alternating directions, from one row to the other, relative to the primary flow direction S. However, it is also conceivable for all of the slits in all of the rows to have the same inclination. Moreover, the number of adjacent slits is not limited to two as is shown in FIG. 3. Through the use of this configuration of parallel rows of slits, the electric current is caused to flow essentially only longitudinally of the strip or in other words perpendicular to the primary flow direction S of the fluids, and in the case of the metal strip structure shown in FIG. 3 it is distributed to three current paths which are parallel to one another. One current path flows along the middle of the sheet-metal strip 2 between the two rows of slits, and the other two current paths flow parallel to it, along the upper and lower edges of the sheet-metal strip 2. Since a potential difference is applied to the metal strip 2 in the honeycomb body 1 between the end of the strip far to the left, which is suggested in FIG. 3, and the end of the strip located far to the right, there is only a slight potential difference in each of the two rows of slits along the sheet-metal regions between adjacent slits 12, and as a result only a very slight current flows. The power output to the metal strip 2 and thus the heating thereof therefore take place primarily in the two peripheral regions and in the middle region of the metal strip 2. This enables a purposefully nonhomogeneous heating of the metal strips 2 and therefore of the honeycomb body 1, and the overall result is a purposeful raising of the electrical resistance of the honeycomb body 1. The nonhomogeneous heating is naturally soon largely balanced out by heat conduction and heat radiation.

Figure 4:
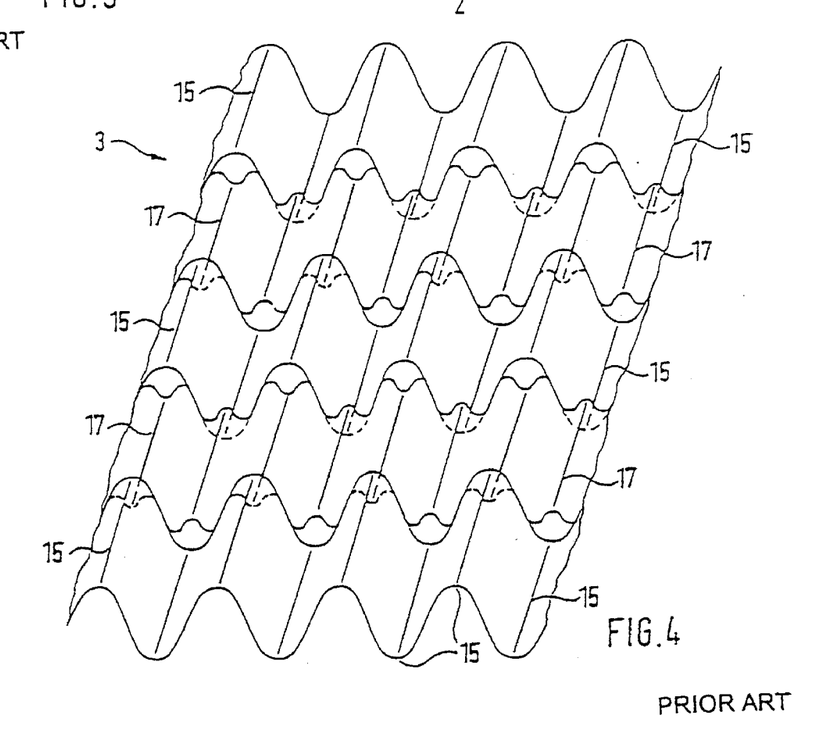
FIG. 4 is a fragmentary, perspective view of a typical corrugated metal strip with deformations and with raised points of the metal strip touching slit-free regions of the smooth metal strip of FIG. 3, while deformed regions of the corrugated metal strip are spaced apart from the slit regions of the smooth metal strip of FIG. 3.

FIG. 4 shows a portion of a corrugated metal strip 3, which has raised points or locations 15 with which it comes into contact with the smooth metal strip 2 of FIG. 3 in the non-slitted regions, during the processing to make a honeycomb body 1. The raised regions 15 of the corrugated metal strip 3 are the crests and troughs of the wave form. The corrugated metal strip 3 also has deformations 17, through which the raised points 15 are bent over, deformed, or pressed flat, so that at the point of the deformations 17 no contact can occur between a smooth metal strip 2 and the corrugated metal strip 3 of FIG. 4. The corrugated metal strip 3 of this exemplary embodiment has three adjacent rows of raised points 15, between which are three rows of less-raised points as a result of the deformations 17. In a preferred exemplary embodiment of the invention, in one stack a smooth metal sheet 2 as in FIG. 3 comes to rest each time next to a corrugated metal strip 3 as in FIG. 4, with the slit rows of the smooth metal strip 2 located at the points of the deformations 17 of the corrugated metal strip 3. As a result, any opportunity for a conductive over-bridging of the slits 12 in the smooth metal strip 2 by the corrugated metal strip 3 is averted.

In another preferred exemplary embodiment, it is possible to replace the deformations 17 in the corrugated metal strip 3 with openings. The sheet-metal material shown in FIG. 4, which is deformed at the point 17, would then be entirely absent. In certain applications, this would be advantageous for the sake of additional savings of weight and material.

Figure 5:
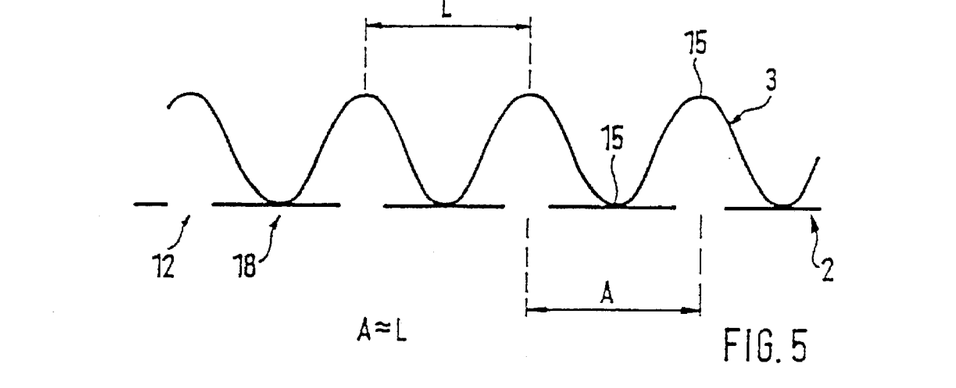
FIG. 5 is a cross-sectional view of two typical, adjacent layers including one smooth and one corrugated metal strip, with a periodicity of a perforation spacing in the smooth metal strip being approximately equal to a corrugation periodicity of the corrugated metal strip.

FIG. 5 shows a smooth metal strip 2 with openings 12 and contact locations or points 18 without the openings. The smooth metal strip 2 is touched at the contact locations or points 18 by the raised locations or points 15 of the corrugated metal strip 3. The corrugated metal strip 3 has a period L. In other words, a spacing between adjacent points 15 is equal to the period L. A spacing between a center of an opening and a center of an opening adjacent it in the smooth metal strip 2 is A, and A is approximately equal to L. Although A can be equal to L, it is advantageous if A is slightly larger than L or slightly smaller than L. This assures that there will be only a very few instances where the openings 12 are bridged over by raised points 15, even if the corrugated metal strip 3 in FIG. 5 is displaced relative to the smooth strip 2 in FIG. 5. This has the advantage, for example, of ensuring that when the two sheet-metal layers 2 and 3 are wound, only a very few "short circuits" will be made in the smooth metal strip 2, and thus the electrical resistance when the sheet-metal layers are wound up will hardly vary from the target electrical resistance, which is due to the measured or calculated resistances of the individual sheet-metal layers 2, 3.

Figure 6:
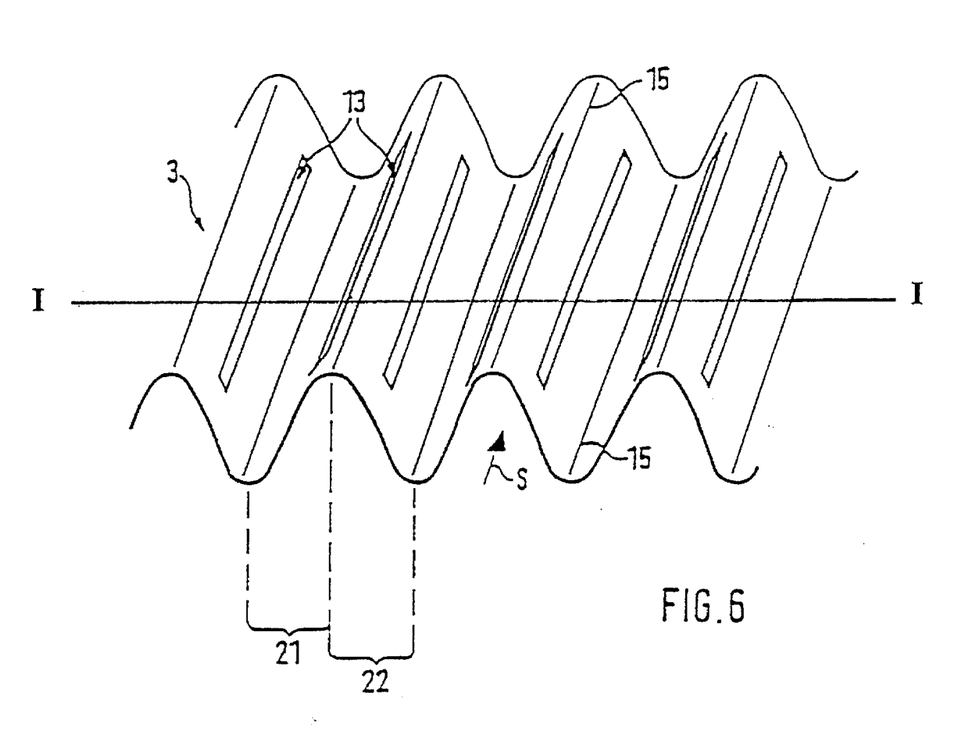
FIG. 6 is a perspective view of a corrugated metal strip with slits only in lateral regions of the metal strip.

FIG. 6 shows a corrugated metal strip 3 with slits 13, which extend approximately parallel to the raised points 15, that is the peaks and valleys, or crests and troughs, of the wave structure. The slits are provided preferably in the rising regions 21 or falling regions 22 of the corrugated metal strip. Thus the slit-like openings 13 are advantageously shifted into the lateral regions 21, 22 of the undulating structure, and therefore an adjacent metal strip has no chance of conductively bridging over the slits 13. It is also conceivable for the slits to be made only in every other, or every third, lateral or flank region, and so forth. This again creates the opportunity of purposefully adjusting the electrical resistance of the corrugated metal strip 3.

Figure 7:
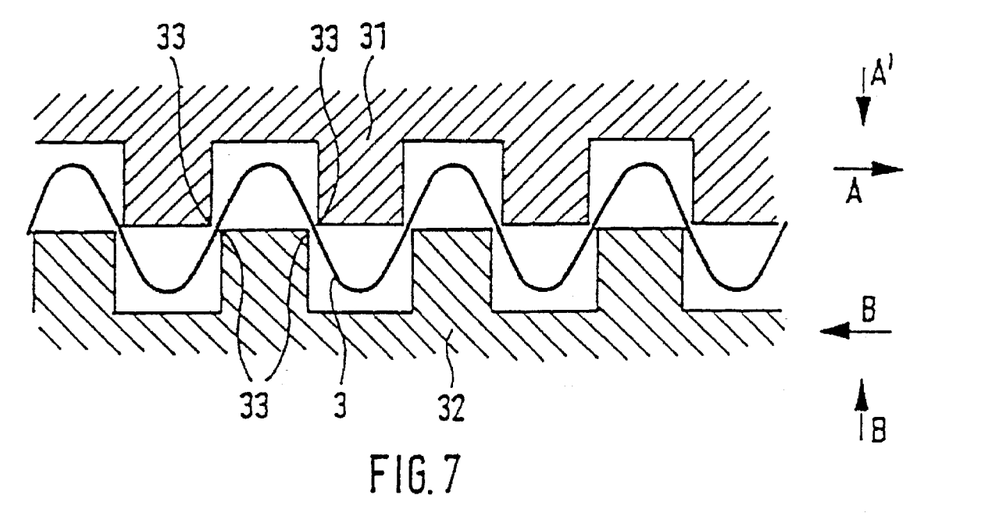
FIG. 7 is a fragmentary view of a shearing device for making slits in a corrugated metal strip by shearing action.

FIG. 7 diagrammatically shows a cross section through a device for producing the slits according to the invention in a corrugated metal strip 3. The device includes a first shears 31 and a second shears 32, which face one another, so that facing edges 33 of the shears extend substantially parallel to one another. Initially, the corrugated metal strip 3 is moved to a location between the first shears 31 and the second shears 32, whereupon the two shears, cutters or clippers 31, 32 are moved toward one another until the metal strip 3 is firmly clamped between opposed shears edges.

Next, by further relative motion of the first shears 31 with respect to the second shears 32, slits are made in the corrugated metal strip 3 by shearing action on the part of the shears edges 33. If the first shears 31 and the second shears 32 are moved relative to one another as is indicated by arrows A and B, then slits only in the rising regions 21 of the corrugated metal strip are obtained. Conversely, if the two shears 31, 32 are moved relative to one another in the direction of the arrows A' and B', then slits are obtained in all of the rising regions 21 and falling regions 22, or in other words one slit in each lateral region 21, 22 is obtained.

Figure 8:
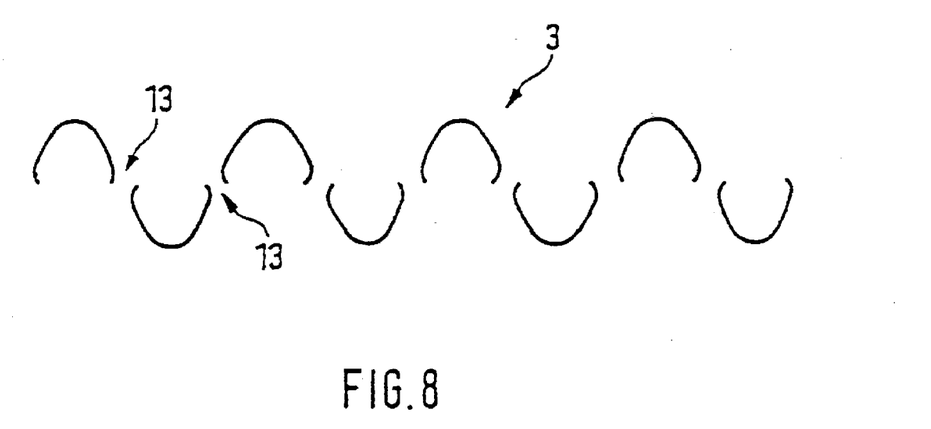
FIG. 8 is a cross-sectional view taken along the line I—I of FIG. 6, showing the result of the shearing action of a shearing device of FIG. 7.

FIG. 8 diagrammatically shows a cross section taken along the line I—I through the corrugated metal strip 3 of FIG. 6. The method described in conjunction with FIG. 7 is employed twice in the directions of the arrows A and B, so as to obtain a slit 13 in all of the rising regions 21 and falling regions 22.

The invention is especially suitable for electrically heatable catalytic converters which are exposed to heavy mechanical loads in motor vehicles having an internal combustion engine, and which have a resistance that must be adapted exactly to predetermined peripheral conditions, such as supply voltage, load capacity of the battery, and so forth.

We claim:

1. An electrically heatable honeycomb body, comprising:
   a plurality of sheet-metal layers, at least some of said sheet-metal layers having a structure defining channels along which a fluid can flow in a primary flow direction;
   said sheet-metal layers including at least one first sheet-metal layer having openings of a given formation and disposition formed therein for increasing an electrical resistance of an electrically conductive path in said at least one first sheet-metal layer and defining locations without said openings in said at least one first sheet-metal layer; and
   said structure of said sheet-metal layers and said formation and disposition of said openings causing sheet-metal layers adjacent to said at least one first sheet metal layer to touch primarily at said locations without said openings in said at least one first sheet-metal layer.

2. The honeycomb body of claim 1, wherein said sheet-metal layers are wound.

3. The honeycomb body of claim 1, wherein said sheet-metal layers are stacked.

4. The honeycomb body of claim 1, wherein said openings are formed to make the electrically conductive path in said at least one sheet-metal layer at least one of longer and narrower.

5. The honeycomb body according to claim 1, wherein said sheet-metal layers include alternating smooth and corrugated sheet-metal layers.

6. The honeycomb body according to claim 1, wherein said adjacent sheet-metal layers touch said at least one first sheet-metal layer independent of a position of said at least one first sheet-metal layer relative to said adjacent sheet-metal layers as seen in a direction perpendicular to the primary flow direction.

7. The honeycomb body according to claim 1, wherein the honeycomb body has a catalytically active coating for catalytically converting convertible components of an exhaust gas.

8. The honeycomb body according to claim 1, wherein at least one of said first sheet-metal layer and respectively adjacent second sheet-metal layer is formed with deformations causing said first and second sheet-metal layers to be spaced apart from one another at said openings.

9. The honeycomb body according to claim 1, wherein at least one second sheet-metal layer adjacent to and touching said at least one first sheet-metal layer with openings also has openings formed therein at least along touching lines where an opening in said first sheet-metal layer would otherwise be crossed by a touching line whereby electrical bridging of said openings in said at least one first sheet-metal layer is avoided.

10. The honeycomb body according to claim 1, wherein said periodic structure is an undulating structure.

11. The honeycomb body according to claim 1, wherein said openings formed in said sheet-metal layers are slits being disposed in said sheet-metal layers at an angle of from 0° to 45° relative to said primary flow direction.

12. The honeycomb body according to claim 11, wherein said angle α is from 10° to 30°.

13. The honeycomb body according to claim 1, wherein said structured sheet-metal layers have a periodic structure with raised locations and a period L, said openings in said sheet-metal layers have centers and are disposed with a spacing A between said centers of adjacent openings as seen in the direction of said periodic structure, A is approximately equal to L, and said raised locations of said periodic structure of said structured sheet-metal layers always touch adjacent sheet-metal layers primarily at said locations without and between said openings.

14. The honeycomb body according to claim 13, wherein said periodic structure of said sheet-metal layers is an approximately sinusoidal periodic structure with rising and falling regions, and said openings are disposed only in at least one of said regions.

15. The honeycomb body according to claim 14, wherein said openings are slits extending approximately parallel to said primary flow direction.

16. The honeycomb body according to claim 15, wherein said openings are slits extending approximately parallel to said primary flow direction.

17. The honeycomb body according to claim 13, wherein said periodic structure of said sheet-metal layers is an approximately trapezoidal periodic structure with rising and falling regions, and said openings are disposed only in at least one of said regions.

18. The honeycomb body according to claim 17, wherein said openings are slits extending approximately parallel to said primary flow direction.

* * * * *